United States Patent
Oleinik et al.

(10) Patent No.: US 9,442,199 B2
(45) Date of Patent: Sep. 13, 2016

(54) DEPTH-OF-INTERACTION SCINTILLATION DETECTORS

(71) Applicant: Zecotek Imaging Systems Pte. Ltd., Singapore (SG)

(72) Inventors: Alexei Oleinik, Richmond (CA); Alexander Zagumennyi, Richmond (CA); Serge Khorev, Richmond (CA); Abdelmounaime Faouzi Zerrouk, Singapore (SG)

( * ) Notice: Subject to any disclaimer, the term of this patent is extended or adjusted under 35 U.S.C. 154(b) by 0 days.

(21) Appl. No.: 14/195,735

(22) Filed: Mar. 3, 2014

(65) Prior Publication Data

US 2014/0299777 A1 Oct. 9, 2014

Related U.S. Application Data

(63) Continuation of application No. 13/232,944, filed on Sep. 14, 2011, now abandoned.

(60) Provisional application No. 61/382,632, filed on Sep. 14, 2010, provisional application No. 61/382,636, filed on Sep. 14, 2010.

(51) Int. Cl.
*G01T 1/20* (2006.01)
*G01T 1/202* (2006.01)

(52) U.S. Cl.
CPC ............. *G01T 1/202* (2013.01); *G01T 1/2002* (2013.01); *G01T 1/2018* (2013.01)

(58) Field of Classification Search
CPC ... G01T 1/2002; G01T 1/202; G01T 1/2985; G01T 1/1644; A61B 6/037
USPC ........................................................ 250/368
See application file for complete search history.

(56) References Cited

U.S. PATENT DOCUMENTS 4,843,245 A    6/1989   Lecomte
4,958,080 A    9/1990   Melcher
(Continued)

FOREIGN PATENT DOCUMENTS

CA    2 464 827    10/2005
EP    1 004 899    5/2000
(Continued)

OTHER PUBLICATIONS

R.S. Miyaoka; T.K. Lewellen; H. Yu; D.L. McDaniel; "Design of a Depth of Interaction (DOI) PET Detector Module", IEEE Transactions on Nuclear Science, vol. 45, No. 3, Jun. 1988; pp. 1069-1073.
(Continued)

*Primary Examiner* — David Porta
*Assistant Examiner* — Edwin Gunberg
(74) *Attorney, Agent, or Firm* — Davis Wright Tremaine LLP; Dylan O. Adams

(57) ABSTRACT

The invention disclosed herein relates to a scintillation detector for registering the position of gamma photon interactions, an comprises an array of two or more elongated first and second scintillation crystal elements connected together along their respective long sides, and an array of discrete photosensitive areas disposed on a common substrate of a solid-state semiconductor photo-detector. The array of first and second scintillation crystal elements have proximal output windows optically coupled to the array of discrete photosensitive areas in a one-to-one relationship. The invention may be characterized in that the first and second scintillation crystal elements include a rooftop portion at their distal ends, wherein the rooftop portion optically couples one of the first and second scintillation crystal elements to the other and is configured to reflect and transmit light resulting from a gamma photon interaction from one of the first and second scintillation crystal elements to the other.

17 Claims, 3 Drawing Sheets

(56) References Cited

U.S. PATENT DOCUMENTS

| | | | |
|---|---|---|---|
| 5,660,627 | A | 8/1997 | Manente et al. |
| 6,031,234 | A | 2/2000 | Albagli et al. |
| 6,278,832 | B1 | 8/2001 | Zagumennyi et al. |
| 6,288,399 | B1 | 9/2001 | Andreaco et al. |
| 6,323,489 | B1 | 11/2001 | McClellan |
| 6,413,311 | B2 | 7/2002 | Melcher et al. |
| 6,528,793 | B1 | 3/2003 | Chen et al. |
| 6,624,420 | B1 | 9/2003 | Chai et al. |
| 6,921,901 | B1 | 7/2005 | Chai et al. |
| 7,091,490 | B2 | 8/2006 | Sumiya et al. |
| 7,132,060 | B2 | 11/2006 | Zagumennyi et al. |
| 7,151,261 | B2 | 12/2006 | Chai |
| 7,166,845 | B1 | 1/2007 | Chai |
| 7,297,954 | B2 | 11/2007 | Kurashige et al. |
| 7,601,963 | B2 | 10/2009 | Aykac et al. |
| 7,618,491 | B2 | 11/2009 | Kurata et al. |
| 7,651,632 | B2 | 1/2010 | Ferrand et al. |
| 7,696,482 | B1 * | 4/2010 | Nagarkar et al. ............. 250/368 |
| 7,749,323 | B2 | 7/2010 | Shimura et al. |
| 7,956,331 | B2 | 6/2011 | Lewellen et al. |
| 8,034,258 | B2 | 10/2011 | Ferrand et al. |
| 8,062,419 | B1 | 11/2011 | Andreaco et al. |
| 2003/0105397 | A1 | 6/2003 | Tumer et al. |
| 2006/0086311 | A1 | 4/2006 | Zagumennyi |
| 2006/0145085 | A1 | 7/2006 | Fukuta |
| 2006/0266276 | A1 | 11/2006 | Shimura et al. |
| 2006/0266277 | A1 | 11/2006 | Usui |
| 2006/0266945 | A1 | 11/2006 | Kurashige et al. |
| 2006/0288926 | A1 | 12/2006 | Kurata et al. |
| 2007/0090328 | A1 | 4/2007 | Dorenbos |
| 2007/0292330 | A1 | 12/2007 | Kurata et al. |
| 2008/0089824 | A1 | 4/2008 | Shimura |
| 2008/0299027 | A1 | 12/2008 | Kurata et al. |
| 2009/0050934 | A1 | 2/2009 | Sadygov et al. |
| 2009/0224164 | A1 | 9/2009 | Lewellen et al. |
| 2010/0078595 | A1 | 4/2010 | Eriksson et al. |
| 2010/0127178 | A1 | 5/2010 | Laurence et al. |
| 2011/0260107 | A1 | 10/2011 | Spurrier et al. |

FOREIGN PATENT DOCUMENTS

| | | |
|---|---|---|
| JP | 2001524163 | 11/2001 |
| JP | 2003253255 | 9/2003 |
| JP | 2007001849 | 1/2007 |
| JP | 2007016197 | 1/2007 |
| JP | 2007297584 | 11/2007 |
| JP | 2008007393 | 1/2008 |
| RU | 02157552 | 10/2000 |
| WO | 9935512 | 7/1999 |
| WO | 2005042812 | 5/2005 |
| WO | WO 2010/078034 A2 | 7/2010 |

OTHER PUBLICATIONS

P.A. Dokhlae; R.W. Silverman; K.S. Shah; R. Grazioso; R. Farrell; J. Glodo; M.A. McClish; G. 2 Entine; V-H Tran and S.R. Cherry; "Performance measurements of a depth-encoding PET detector modle based on position-sensitive avalanche photodiode read-out", Phys. Med. Bioi. 49 (2004) pp. 4293-4304.

Y. Shao; K. Meadors; R.W. Silverman; R. Farrell; L. Cirignano; R. Grazioso; K.S. Shah, and S.R. Cherry, "Dual APD Array Readout of LSO Crystals: Optimization of Crystal Surface Treatment", IEEE Transactions on Nuclear Science, vol. 49, No. 3, Jun. 2002; pp. 649-654.

Atsushi Ohtani; Kazumi Tanka; Keishi Kitamura; Tetsuro Mizuta; Yoshihiro Inoue; Hiromichi Tonami; Junichi Ohi; Development of a high resolution Whole-Body DOI PET Systems, 2007 IEEE Nuclear Science Symposium Conference Record.

Naoko Inadama; Hide; 0 Murayama; Manabu Hamamoto; Tomoaki Tsuda; Yusuke Ono; Taiga Yamaya; Eiji Yoshida; Kengo Shibuya, and Fumihiko Nishikido, "8-Layer DOI Encoding of 3-dimensional Crystal Array", IEEE Transactions on Nuclear Science, vol. 53, No. 5, Oct. 2006.

J.S. Huber, W.W. Moses; M.S. Andreaco, and 0. Pederson, "An LSO Scintillator Array for a PET Detector Module with Depth of Interaction Measurement", IEEE Transactions on Nuclear Science, vol. 48, No. 3, Jun. 2001, pp. 684-688.

USPTO, Office Action dated Mar. 25, 2013 for U.S. Appl. No. 13/232,944, filed Sep. 14, 2011.

USPTO, Notice of Allowance and Fee(s) Due dated Dec. 11, 2013 for U.S. Appl. No. 13/232,944, filed Sep. 14, 2011.

International Search Report of PCT/CA2011/001035 dated Oct. 24, 2011.

Kobayashi, M., et al,. "Radiation damage of cerium-doped lutetium oxyortosilicae single crystal". Nucl. Instr. and Meth. A 335 (1993) 509-512.

Kozlov et al., "LSF-3—new radiation hard scintillator for electromagnetic calorimeters", Dec. 2, 2009, physics.ins-det, pp. 1-4.

Kozlov et al., "Proton induced damage in LFS-3 and LFS-8 scintillating crystals", May 25, 2011, physics.ins-det, pp. 1-5.

Kozma, P., et al., "Radiation sensitivity of GSO and LSO scintillation detectors". Nucl. Instr. and Meth. A 539 (2005) 132-136.

Qin, Laishun, et al., "A new radiation damage phenomenon of LSO:Ce scintillation crystal", Nuclear Instruments and Methods in 10 Physics Research A 545 {2005) 273-277.

Spurriera, M.A., et al., "The effect of co-doping on the growth stability and scintillation properties of lutetium oxyorthosilicate" Journal of Crystal Growth 310 (2008) 2110-2114.

Wikipedia (https://en.wikipedia.org/wiki/Particulates), printed Mar. 1, 2016, 22 pages.

Zavartsev, et al., "Czochralski groVv1h and characterisation of large Ce3+: 2 Lu2Si05 single crystals codoped with Mg2+ or Ca2+ or Tb3+ for scintillators" J. Crystal GroVv1h, vol. 275, Iss. 1-2, (2005) pp. e2167-e2171.

Zecotek (http://www.zecotek.com/503/11 05/), printed Mar. 2, 2016, 1 page.

Zhu, Ren-Yuan, "LYSO crystals for SLHC". CMS ECAL Workshop at Fermilab, Nov. 20, 2008.

International Search Report (International application No. PCT/IB2013/002779), date of mailing Apr. 10, 2014.

Extended European Search Report issued in EP Patent Application No. EP 13 77 6073, mailed Dec. 3, 2015, 8 pages.

Written Opinion of the International Searching Authority PCT/CA2013/000349 mailing date Oct. 9, 2013.

* cited by examiner

DEPTH-OF-INTERACTION SCINTILLATION DETECTORS

CROSS-REFERENCE TO RELATED APPLICATIONS

This application is a continuation of U.S. application Ser. No. 13/232,944 filed on Sep. 14, 2011. This application claims the benefit of and priority to U.S. Provisional Application No. 61/382,632 and U.S. Provisional Application No. 61/382,636, both filed on Sep. 14, 2010. All priority applications are incorporated herein by reference in their entireties for all purposes.

TECHNICAL FIELD

The invention pertains to the field of imaging gamma ray detectors such as Positron Emission Tomography (PET) and, in particular, to scintillation detectors for registering not only the transverse coordinates of gamma quanta interactions within the crystalline material of the scintillator elements of the detector, but also their depth within individual scintillator elements (commonly referred to as Depth of Interaction (DOI)), which leads to improvement in spatial resolution of PET (or any other) imaging systems based on ring detector positions, especially at the periphery of the system's field of view.

BACKGROUND OF THE INVENTION

Positron emission tomography is a 3-dimensional imaging technique of nuclear medicine that creates a spatial (3D) map of functional activities in a living organism, including those of human patients. This technique is based on the introduction into a studied organism a positron-emitting radionuclide attached to a biological agent (such as, for example, fluorodeoxyglucose) and the subsequent study of its distribution throughout the studied organism (after a certain time needed for this agent to penetrate the body and to concentrate in areas of interest).

A positron emitted by the radionuclide travels a few millimeters within the biological tissue of the studied organism before annihilation with an electron. This annihilation event generates two 511 keV gamma quanta propagating in almost opposite directions (at 180±0.23°) from each other. These two high-energy photons can be captured in order to determine the approximate position of the annihilation event. In a typical PET system, these photons are absorbed by scintillation elements placed around the studied organism in a ring configuration, generating bursts of lower-energy visible photons, which, in their turn, are registered by photo-detectors attached to each scintillation element. Because each pair of high-energy photons travels in a virtually straight line (commonly referred to as the line of response (LOR)), it is possible to localise the tagged biological agent by calculating LOR intersections (so-called 'sweet spots'). High-energy photons not arriving in pairs are rejected by using coincidence detection.

In conventional systems, the spatial coordinates of a gamma photon absorption event can be determined only to the precision of one scintillation element size. Because of a greater importance of the transverse coordinates, these scintillation elements have an elongated form with relatively small cross-section facing the centre of the field of view (see, e.g., FIG. 1—Prior Art), which leads to good spatial resolution in the central part of the studied volume, but also to progressive degradation of it towards the periphery caused by attribution of incorrect LOR's to absorption events. It is therefore desirable to determine the positions of photon interactions along the long dimension of the scintillation elements, usually called the depth-of-interaction (DOI). PET scanners providing DOI measurement can assign LORs to photon absorption events more accurately, thus resulting in better resolution uniformity across the field of view.

A number of methods have been so far proposed for addition of the DOI capability, however, most of them rely on additional detector electronics, thereby requiring considerably more complicated hardware and introducing numerous other issues (for example, gamma quant absorption in the front-facing electronics and increased dead space in the detector ring). Among these prior art methods include U.S. Patent Pub. No. 2003/0105397 to Tumer et al., which describes a dual-detector readout where two detectors are disposed at opposite ends of a scintillation crystal bar. Dual photo-detector (PD) readout scintillation blocks cannot be packed as tightly as single PD read-outs resulting in dead spaces between blocks where gamma-quanta cannot be captured. Besides, this scheme requires twice as many PD and other electronic components (as compared to single PD read-outs) thereby increasing production costs.

Phoswitch detectors with two or more different scintillator layers discriminated by their decay time are also known for DOI measurements. For example, U.S. Pat. No. 4,843,245 to Lecomte teaches using multi-layer detector consisting of scintillators with different decay time. Although this approach allows rough DOI indexing, which improves the resolution of PET imaging, it is inherently limited by the discrimination abilities of the detection electronics and by the choice of available scintillation materials. Besides, it requires much longer coincidence windows, leading to more sparse number of events collected and to more false coincidence counts, which all make image reconstruction more difficult.

Another approach disclosed in U.S. Pat. No. 7,091,490 to Sumiya et al., consists of using a multilayer scintillator detector incorporating both light sharing and decay time discrimination. This design requires multiple scintillation crystals with different surface treatment and separated by different transparent, reflective, or opaque optical interfaces (incorporated into the detector element), which arguably makes this approach even more complicated than those based on dual detectors because of the very complex composition of the scintillation element.

One specific method uses light sharing between two adjacent scintillating crystals along the long dimension that does not lead to complication of the detector electronics and allows for the extraction of DOI information on the basis of the ratio of light signals collected by detectors attached to each crystal of the pair. It is the subject of U.S. Pat. No. 7,956,331 to Lewellen et al. and provides the means to add the DOI capability to a PET detector without introduction of any additional electronics, relying on shaped opaque screens and/or special optical interface layers between adjacent crystals and on solid-state micro-pixel detectors.

This approach fulfils the technical requirements for a DOI-capable PET system. However, a number of issues associated with detector manufacturing remain to be solved. For example, like in all conventional PET detectors, the approach outlined in U.S. Pat. No. 7,956,331 to Lewellen et al. requires that each scintillation crystal pair be assembled from individual elements and the opaque and transparent layers for light sharing be interposed between them. In turn, each pair of crystals has to be (mostly manually) assembled into a detector block with appropriate reflection and light isolation layers between them. It is desirable, however, to manufacture scintillation detector blocks in a more industrialised and automated way while keeping the valuable DOI capability. The present invention provides, among other things, an alternative approach to adding DOI capability to PET scintillation detectors in a very cost-effective manner that opens further possibilities of automation and improvement of PET detector manufacture.

SUMMARY OF THE INVENTION

The present invention is related to scintillation detectors capable of detecting the position or depth of gamma photon interactions occurring within a scintillator. One of the embodiments of this invention comprises at least one pair of conjunct scintillation crystal bars, wherein each pair of conjunct scintillation crystal bars is composed of two individual scintillation crystal bars positioned in a side-by-side configuration, and connected along their long sides and optically isolated from each other and from the ambient environment on the four long sides. The remaining two small faces of each crystal bar serve as optical windows, and their surfaces may be polished and coated as necessary in order to facilitate or restrict light coupling out of the crystal bars. Two adjacent coupling windows of the crystal bars of each pair are optically coupled to each other by means of a reflecting element (i.e., a "rooftop") attached to them with the aid of an optical interface layer and further comprising, in one of the embodiments, a retro-reflective prism with coated reflecting faces, for light sharing between one scintillation crystal bar and the other.

The scintillation detector also comprises a solid-state semiconductor photo-detector optically coupled to the adjacent optical windows of each pair of conjunct scintillation crystal bars opposite to the optical windows coupled with the reflective element. The solid-state photo-detector includes an array of discrete photosensitive areas disposed on top of a preferably flat surface of a common substrate such that each of the sensitive areas is optically coupled to the open optical window of each scintillation crystal bar of each conjunct pair in a one-to-one relationship.

A burst of visible photons inside one of the bars of a conjunct pair of scintillation crystal bars (produced as a result of a gamma photon interaction event) is shared between the two adjunct crystal bars and the information about the location of this event along the length of the adjunct scintillation crystal bars may then be estimated by measuring the ratio of photo signals recorded by the respective photosensitive areas of the photo-detector coupled to each optical output window of the conjunct bars.

These and other embodiments of the invention will be explained in further detail in the following detailed description and accompanying drawings. It is to be understood, however, that various changes, alterations, and substitutions may be made to the specific embodiments disclosed herein without departing from their essential spirit and scope. In addition, it is expressly provided that all of the various references cited herein are incorporated herein by reference in their entireties for all purposes.

BRIEF DESCRIPTION OF THE DRAWINGS

These illustrations will complement the summary given above and the detailed description that follows for better understanding of the invention. In addition, like reference numerals have been used to designate like features throughout the several views of the drawings.

DETAILED DESCRIPTION OF THE INVENTION

Figure 1A:
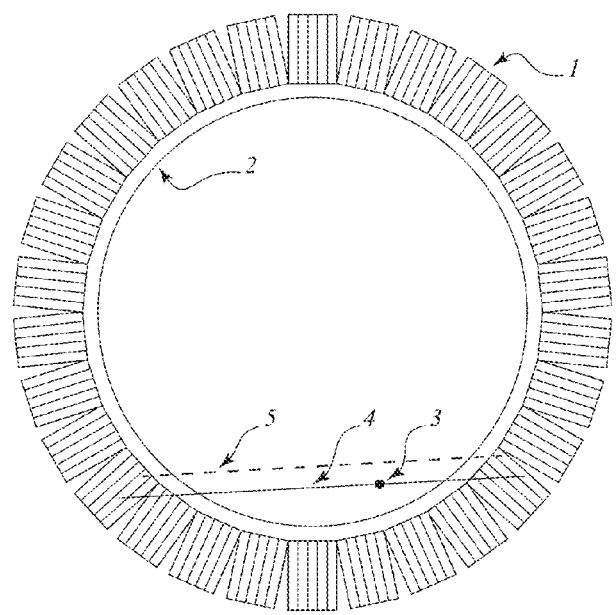
FIG. 1a (Prior Art) provides a schematic side view of a conventional PET detection ring 1 with its field of view boundary 2 and shows an electron-positron annihilation event 3 happening toward the periphery of the view field together with the actual LOR 4 and the assumed (misplaced) LOR 5 measured from coincident gamma photons captured by the corresponding detector elements.
Figure 1B:
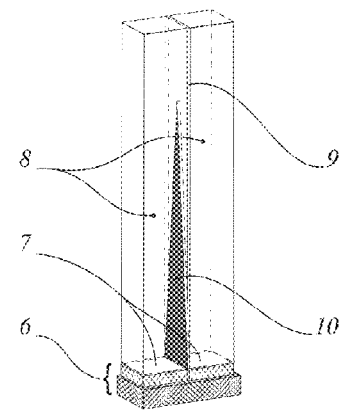
FIG. 1b (Prior Art) provides a perspective schematic view of a prior art PET detector (U.S. Pat. No. 7,956,331 to Lewellen et al.) where base portion 6 is a solid-state photo-detector coupled to output windows 7 of scintillation crystal bars 8 separated by optical interface layer 9 and optical separation layer 10.

The present invention is directed to scintillation detectors capable of registering the depth coordinate of γ-photon interactions occurring within the scintillation material of the detector, thereby improving the resolution of ring-based PET imaging systems. In one embodiment and with reference to the figures (especially FIG. 2a), the present invention is directed to a scintillation detector for measuring the depth position of γ-photon interactions that comprises at least one pair of conjunct scintillation crystal elements or bars 8. Each pair of conjunct scintillation crystal bars 8 includes (i) an optical separation layer 14 positioned between two discrete scintillation crystal bars 8 for restricting light sharing between scintillation bars 8, (ii) distal coupling windows 13, one on the distal end (top portion in all Figures except FIG. 1a) of each conjunct scintillation crystal bar, which are in optical contact with each other, optionally by an intermediary of an optical interface layer 12, and (iii) light guiding chamfers 11 at the distal end of each conjunct scintillation crystal bar 8 (in contrast to rectangular crystal bar shape known in the art). The light guiding chamfers 11 may have different sizes 24 with respect to the width of each crystal bar 8, as well as different angles of cut 23 with respect to the longest face of each crystal bar 8 (as may be needed to optimise light sharing between conjunct crystal bars 8 in which a γ-photon interaction occurred in one of the bars). Similarly, the distal coupling windows 13 may have different sizes 26 and shapes to further optimise light sharing (see FIGS. 4a-b). Light guiding chamfers 11 reflect a fraction of light produced in a γ-photon interaction event so that it reaches the other crystal bar of each pair of conjunct scintillation crystal elements 8 (FIG. 3a) in contrast with conventional light sharing methods (FIG. 3b—Prior Art), in which this portion of produced light would be reflected back into the same crystal bar.

In order to further increase the collection of visible light generated in a γ-photon interaction event and optimise light sharing between the two discrete scintillation bars 8, the surface of each bar 8 may be treated mechanically (for instance, ground or polished) or chemically (for example, etched). The proximal output windows 7 are preferably polished to ensure sufficient light collection and to enhance light transmission. In order to further improve light collection and to prevent optical cross-talk between one pair of conjunct scintillation crystal bars 8 with another, the outer faces of each scintillation crystal bar 8 may be covered with a light absorbing or reflective coating. In addition, the optical isolation layer 14 may have non-uniform opacity, be reflective, and/or serve as a light diffuser.

The material of each individual scintillation crystal bar 8 is preferably selected from the group consisting of LFS, SLO, LYSO, GSO, LGSO, LuAP, BGO, NaI, and $PbWO_4$. The individual bars of each conjunct scintillation crystal bar pairs making up the detector are preferably made of the same scintillation material, which is preferably LFS scintillation crystal (available from Zecotek Photonics, Inc.). The material of each scintillation crystal bar 8 also preferably has a light output of more than 80% NaI:Tl and short fluorescence decay time below 50 ns, as well as density of greater than 6 $g/cm^3$.

Figure 5A:
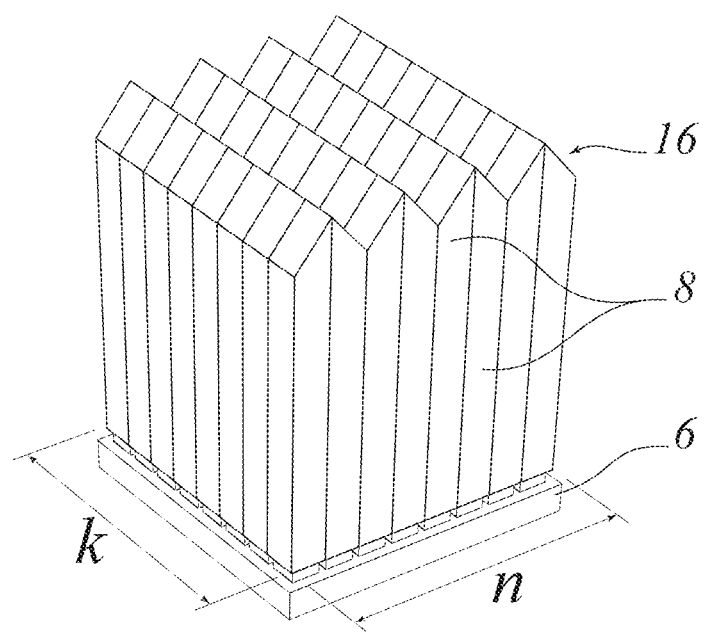
FIG. 5a is a perspective view of a detector block according to another embodiment of the invention, where the detector block consists of an n×k array of chamfered pairs of crystalline scintillation bars 8 (with each chamfered crystalline pair in the form of a detector shown in FIGS. 2a, 3a, and 4a) coupled to an array of 2n×k photo detectors 6.

In further embodiments, the scintillation detector of the present invention also includes a solid-state semiconductor photo-detector 6 (available from Zecotek Photonics, Inc.) whose photosensitive areas are optically coupled to proximal output windows of each individual scintillation crystal bar 8 in a one-to-one relationship. Unlike conventional position-sensitive photo-multiplier tubes (PMT) known in the art, the solid-state semiconductor photo-detector 6 of the present invention includes an array of discrete sensitive areas disposed on top of a common substrate defining a generally flat surface. Each sensitive area of photo-detector contains an array of micro-pixel avalanche photo-diodes preferably embedded in the material of each sensitive area. The pixel (independent p-n junctions) density of each sensitive area is preferably greater than 1,000 pixel/$mm^2$. For many applications, micro-pixel density of 5,000 to 15,000 pixels/$mm^2$ is sufficient, but still more preferably it is around or greater than 40,000 pixels/$mm^2$. As shown in figures, the proximal output window of each scintillation crystal bar 8 is coupled to each respective sensitive area of photo-detector 6 in a one-to-one relationship. The overall perspective view of this embodiment of the present invention is shown in FIG. 5a where an array of n×k pairs of crystalline scintillation bars 8 are interfaced with the solid-state photo-detector 6 having 2n×k discrete sensitive areas in a one-to-one relationship with each of the scintillation crystal bars 8.

Figures 2A, 2B, 2C:
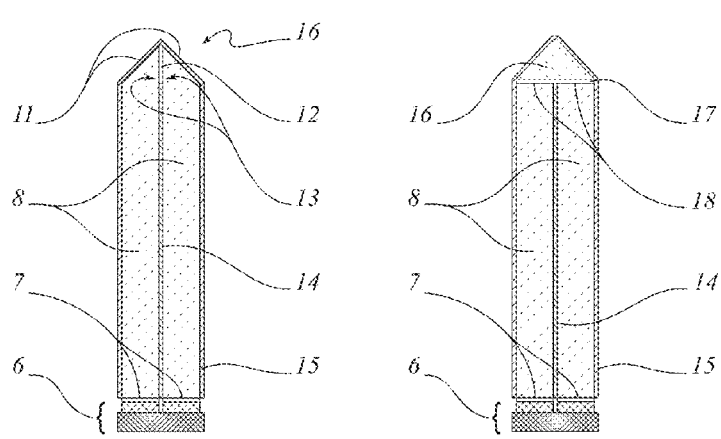
FIG. 2a is a sectional view of a first embodiment of the innovative detector, where base portion 6 represents a photo-detector with its corresponding photosensitive areas on a common substrate coupled to output windows 7 of conjunct scintillation crystal bars 8. The crystal bars 8 have light guiding chamfers 11 (that define a rooftop portion 16) and are coupled to each other by means of optical interface layer 12 and distal coupling windows 13. The adjacent faces of the crystal bars 8 are attached to each other through an optical separation layer 14 and covered with an optical isolation coating 15 on the outside.
FIG. 2b is a sectional view of a second embodiment of the innovative detector that in addition to elements like those of FIG. 2a (and indicated by the same reference numbers) shows a rooftop portion 16 defined by a retro-reflector crystal element configured to enable light sharing between conjunct scintillation crystal bars 8. The rooftop portion 16 is coupled to the crystal bars 8 through an optical interface layer 17 and distal coupling windows 18.
FIG. 2c is a sectional view of another embodiment of the innovative detector that in addition to elements like those of FIG. 2a (and indicated by the same numbers) shows a U-shaped scintillation crystal 19 with two coupling proximal windows 7, light guiding chamfers 11 (that define a rooftop portion 16), and a narrow cut filled with an optical separation layer 14.
Figure 3A:
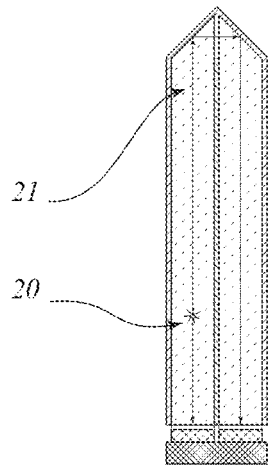
FIG. 3a shows how chamfers making part of the present invention guide the light emitted in a gamma photon interaction, where 20 is a γ-photon interaction point (where visible light is generated) and arrow 21 indicates a significant portion of the emitted light being shared with the second scintillation crystal bar.
Figure 3B:
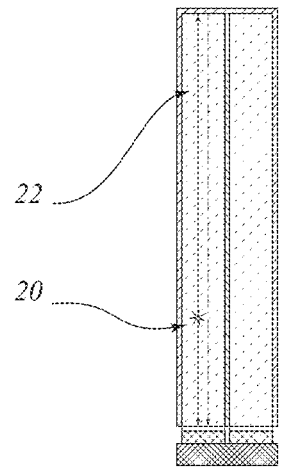
FIG. 3b (Prior Art) illustrates that in a conventional light-sharing scheme a significant amount of light 22 is reflected back (dashed line) to the detector sensitive area coupled to the crystal bar in which a gamma photon interaction took place.
Figure 4A:
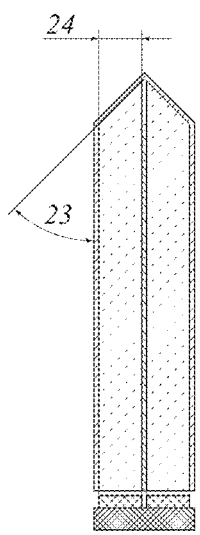
FIG. 4a depicts the light guiding chamfer position, its angle 23 and size 24.
Figure 4B:
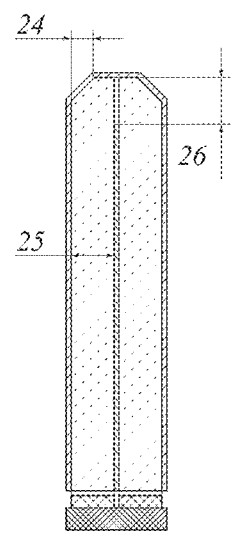
FIG. 4b demonstrates the coupling window and light guiding chamfer positions, as well as light guiding chamfer size 24, the crystal bar width 25, and coupling window size 26 as parameters that can be used to adjust the character and the amount of light sharing between two photo-detectors.
Figure 5B:
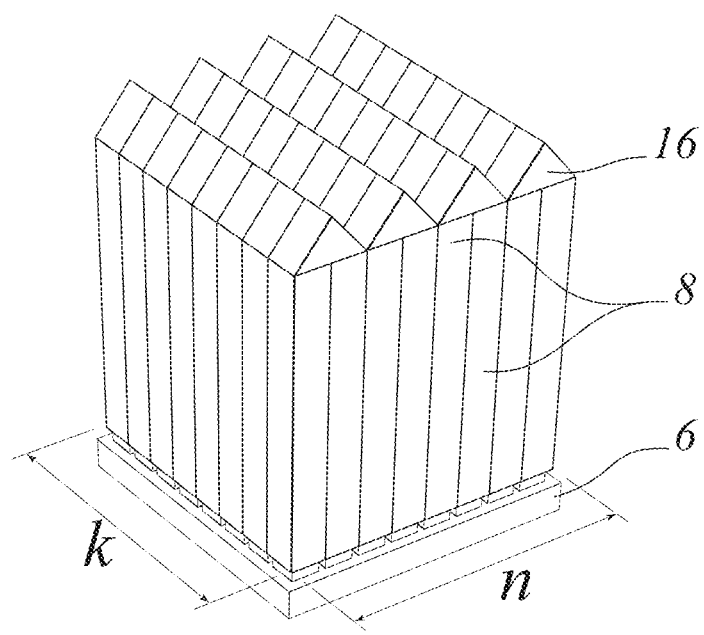
FIG. 5b represents a prospective view of a detector block according to another embodiment of the invention, where the detector block consists of an n×k array of pairs of crystalline scintillation bars 8 (with each crystalline pair in the form of a detector shown in FIG. 2b) coupled to an array of 2n×k photo detectors 6 through their proximal output windows with the crystal bars of each pair coupled to each other through their distal coupling windows and retro-reflectors 16.

In another embodiment and with reference to FIG. 2b, the present invention is directed to a scintillation detector similar to that of the previous embodiment, but in which instead of light guiding chamfers cut into the distal end of individual scintillation crystal bars each crystal bar of each conjunct pair of scintillation crystal bars has a distal optical coupling window 18, which is coupled to a retro-reflector 16 (i.e., a rooftop portion or element), preferably in the shape of a prism and made of material having preferably the same or similar refractive index as the scintillation crystal bars 8. The angle and the size of the light guiding faces of the retro-reflector may be different as needed for optimisation of light sharing between each two conjunct pair of scintillation crystals 8, in analogy to the size and angle of light guiding chamfers of the first embodiment as depicted in FIGS. 4a-b. The surface of the retro-reflector is preferably optically polished to facilitate internal light reflection and depending on the particular configuration of the scintillation detector may be covered by a reflective coating (save the coupling side which is preferably attached to the distal coupling windows of each pair of conjunct scintillation crystal 8 by means of an optical glue or another optical interface layer preferably having the same or at least similar refractive index as the material of the scintillation crystal bars). The coupling face of the retro-reflector 16 as well as the distal coupling windows of the crystal bars 8 may be antireflection-coated to improve optical coupling between the crystal bars. In addition, the totality of retro-reflectors attached to each conjunct pair of scintillation crystal bars 8 may be fabricated of optically transparent plastic material by stamping, injection moulding, or another similar technique in one operation and as one unit (being, however, optically isolated from each other), which is subsequently attached to the distal end of the array of conjunct scintillation crystal bars as shown in FIG. 5b. This embodiment retains all the advantages of the previous one, being furthermore easier to manufacture and possibly using cheaper materials. The overall perspective view of this embodiment of the present invention is shown in FIG. 5b where an array of n×k pairs of crystalline scintillation bars 8 are interfaced at their proximal ends with the solid-state photo-detector 6 having 2n×k discrete sensitive areas in a one-to-one relationship with each of the scintillation crystal bars 8. On their distal ends, each conjunct pair of scintillation crystal bars making the array is interfaced with a corresponding retro-reflector element 16, the array of retro-reflectors being possibly fabricated as a single assembly part and attached in one simple operation.

In yet another embodiment of the present invention and with reference to FIG. 2c, each conjunct pair of scintillation crystal bars of previous embodiments is replaced by a single U-shaped scintillation crystal 19 with proportions of its branches similar to those of crystal bars 8 of other embodiments depicted in FIGS. 2a-b, 3a, 4a, 5a-b and with a narrow slot between them filled with optical separation layer 14 analogous to similar layers of the other embodiments. The distal end of the U-shaped scintillation crystal bar 19 has light guiding chamfers 11 (that defines a rooftop portion) similar to those found in other embodiments of the invention that use separate scintillation crystals 8 in pairs. This configuration has the advantage of removing optical interfaces existing between the crystal bars of each conjunct pair of scintillation crystals of other embodiments of this invention. This eliminates Fresnel losses and optical losses caused by internal reflections, thereby improving the light collection efficiency.

All of the possible embodiments of the present invention, including those discussed above, share an important advantage over dual-detector read-out techniques (where a photo-detector is used on each end of the scintillation crystal bar). Having the same geometrical dimensions and the same transverse spatial resolution, the innovative detector devices of the present invention offer twice the optical path between detectors as compared to the said dual-detector techniques, thereby providing higher output signal ratio. This improvement is expected to make DOI measurement more accurate.

This invention is not limited to the specific details disclosed. While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A scintillation detector for registering the position of gamma photon interactions, comprising:
   an array of two or more elongated first and second scintillation crystal elements connected together along their respective long sides; and
   an array of discrete photosensitive areas disposed on a common substrate of a solid-state semiconductor photo-detector, wherein the array of first and second scintillation crystal elements have proximal output windows optically coupled to the array of discrete photosensitive areas in a one-to-one relationship;
   characterized in that the first and second scintillation crystal elements include a rooftop portion at their distal ends, wherein the rooftop portion optically couples one of the first and second scintillation crystal elements to the other and is configured to reflect and transmit light resulting from a gamma photon interaction from one of the first and second scintillation crystal elements to the other.

2. The scintillation detector of claim 1 wherein the first and second scintillation crystal elements of the array of first and second scintillation crystal elements define a plurality of conjunct scintillation crystal pairs, wherein each conjunct scintillation crystal pair is optically isolated from each of the other conjunct scintillation crystal pairs.

3. The scintillation detector of claim 2 wherein each conjunct scintillation crystal pair includes an optical separation layer positioned in between the first and second scintillation elements, wherein the optical separation layer restricts light sharing between the first and second scintillation elements.

4. The scintillation detector of claim 3 wherein the rooftop portion is defined by first and second light guiding chamfers, wherein the first light guiding chamfer is an integral portion of the first scintillation crystal element, and wherein the second light guiding chamfer is an integral portion of the second scintillation crystal element.

5. The scintillation detector of claim 4 wherein the distal ends of the first and second scintillation crystals include confronting optical coupling windows, wherein the optical coupling windows are positioned in between the first and second light guiding chamfers and are separated from each other by way of an interposing optical coupling layer.

6. The scintillation detector of claim 3 wherein the rooftop portion is defined by a separate prism element, wherein the separate prism element is made of a material that has the same or substantially the same index of refraction as the first and second scintillation elements.

7. The scintillation detector of claim 6 wherein the first and second scintillation elements each includes a distal optical coupling window, wherein the separate prism element is optically coupled to the distal optical coupling windows by way of an interposing optical coupling layer.

8. The scintillation detector of claim 1 wherein the first and second scintillation crystal elements are integral with each other and define first and second branches of a single U-shaped scintillation crystal element.

9. The scintillation detector of claim 8 wherein the first and second branches are separated from each other by way of an interposing optical separation layer.

10. The scintillation detector of claim 3 wherein the optical separation layer has a non-uniform opacity.

11. The scintillation detector of claim 3 wherein the optical separation layer is reflective or diffusively reflective.

12. The scintillation detector of claim 1 wherein the rooftop portion defines an angle of between about 35 degrees to about 80 degrees relative to the long sides of the first and second scintillation crystals.

13. The scintillation detector of claim 2 wherein each conjunct scintillation crystal pair includes an optical isolation layer on its outer surface.

14. The scintillation detector of claim 13 wherein the optical isolation layer is reflective or diffusively reflective.

15. The scintillation detector of claim 14 wherein the optical isolation layers includes a first portion that covers the outer surfaces of the first and second scintillation crystals and a second portion that covers the outer surfaces of the rooftop portion, wherein the first and second portions of the optical isolation layer are of different materials.

16. The scintillation detector of claim 1 wherein the first and second scintillation crystal elements are substantially identical with one another and are selected from the group consisting of LFS, SLO, LYSO, GSO, LGSO, LuAP, BGO, NaI, and $PbWO_4$ crystals.

17. The scintillation detector of claim 1 wherein the array of discrete photosensitive areas defines an array of discrete micro-pixel avalanches photodiodes.

* * * * *